(12) United States Patent
Lee et al.

(10) Patent No.: US 6,490,291 B1
(45) Date of Patent: Dec. 3, 2002

(54) DEVICE FOR DATA COMMUNICATIONS BETWEEN WIRELESS APPLICATION PROTOCOL TERMINAL AND WIRELESS APPLICATION SERVER, AND METHOD THEREOF

(75) Inventors: Sang-seo Lee, Seoul (KR); Yong-suk Kim, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/249,091

(22) Filed: Feb. 12, 1999

(30) Foreign Application Priority Data

Oct. 2, 1998 (KR) ............................................. 98-41754

(51) Int. Cl.[7] ................................................. G09G 5/00
(52) U.S. Cl. ....................................... 370/401; 370/410
(58) Field of Search ................................. 370/310, 315, 370/328, 338, 352, 353, 354, 355, 356, 401, 410, 465, 466, 467; 709/203, 227, 238

(56) References Cited

U.S. PATENT DOCUMENTS 6,044,062 A * 3/2000 Brownrigg et al. ......... 370/315
6,088,340 A * 7/2000 Buchholz et al. ........... 370/310

OTHER PUBLICATIONS

ETSI, Mobile Station Execution Environment Feasibility Study, pp. 1–18, Sep. 24–25, 1997.*
WAP Forum, Wireless Application Protocol: Wireless Datagram Protocol Specification, pp. 1–52, Apr. 30, 1998.*
WAP Forum, Wireless Application Protocol: Architecture Specification, pp. 1–20, Apr. 30, 1998.*
Contribution to WAP Forum WPG on WAP over CDMA IS–707 CSD; Jul. 20, 1998; pp. 1–6 and pp. 1–2.

* cited by examiner

Primary Examiner—Wellington Chin
Assistant Examiner—Frank Duong
(74) Attorney, Agent, or Firm—Sughrue Mion, PLLC (57) ABSTRACT

A device for data communications between a Wireless Application Protocol (WAP) terminal and a WAP server, and a data communication method thereof. The data communications device includes: a plurality of WAP terminals each having a protocol stack in which a Circuit Switch Data service (CSD) protocol layer is laid under a Wireless Transaction Protocol (WTP) layer and a Wireless Datagram Protocol (WDP) layer, for generating WAP data which is service request data; a plurality of WAP servers each having a protocol stack in which a Transmission Control Protocol (TCP) layer and an Internet Protocol (IP) layer are laid under a WTP layer and a WDP layer, for providing the WAP terminals with WAP server data according to the WAP data; and an interworking function (IWF) unit having a CSD protocol layer connected to the CSD protocol layers of each WAP terminal, and a TCP layer and an IP layer which are connected to the TCP and IP layers of each WAP server, for mapping the WAP terminals to the corresponding WAP servers, wherein each WAP terminal communicates with the IWF unit though a single Internet Protocol/Peer-to-Peer Protocol (IP/PPP) layer included in its own CSD protocol layer, and the IWF unit communicates through the Internet with each WAP server. Because there is no redundancy of IP/PPP protocol layers in the WAP terminal, overhead is considerably reduced. Also, the IWF unit is directly connected through the Internet to the WAP server, not through the PSTN and the ISP, so that connection time and costs can be reduced.

4 Claims, 6 Drawing Sheets

DEVICE FOR DATA COMMUNICATIONS BETWEEN WIRELESS APPLICATION PROTOCOL TERMINAL AND WIRELESS APPLICATION SERVER, AND METHOD THEREOF

BACKGROUND OF THE INVENTION

1. Field of the Invention

The present invention relates to data communications, and more particularly, to a device for data communications between a Wireless Application Protocol (WAP) terminal and a WAP server, and a method thereof.

2. Description of the Related Art

In general, a WAP server is connected between an Internet server which provides various information and a WAP terminal capable of receiving the information provided from the Internet server, to convert different data formats and different protocols between the Internet server and the WAP terminal. Also, the WAP server can provide the WAP terminal with its own information.

Figure 1:
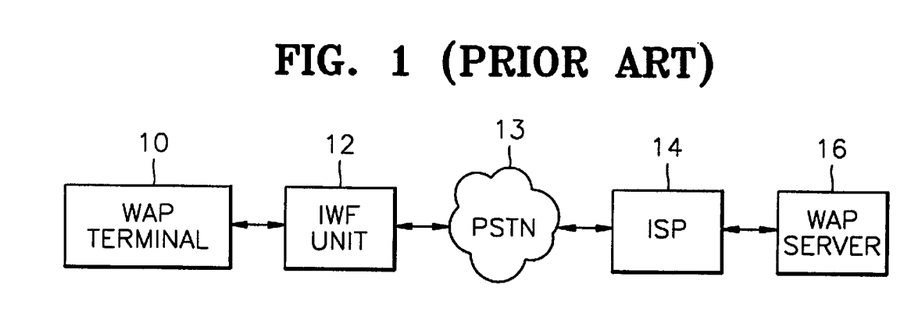
FIG. 1 is a block diagram of a conventional device for data communications between a Wireless Application Protocol (WAP) terminal and a WAP server.

FIG. 1 is a block diagram of a conventional data communications device between a WAP terminal and a WAP server.

The data communications device of FIG. 1 comprises a WAP terminal 10, an interworking function (IWF) unit 12, a public switched telephone network (PSTN) 13, an Internet service provider (ISP) 14 and a WAP server 16.

The IWF unit 12 performs routing functions between the WAP terminal 10 and the ISP 14. The ISP 14 is one of companies providing general communication service such as HITEL or UNITEL. The WAP server 16 provides the WAP terminal 10 with its own information and much information from an Internet server (not shown).

Figure 2:
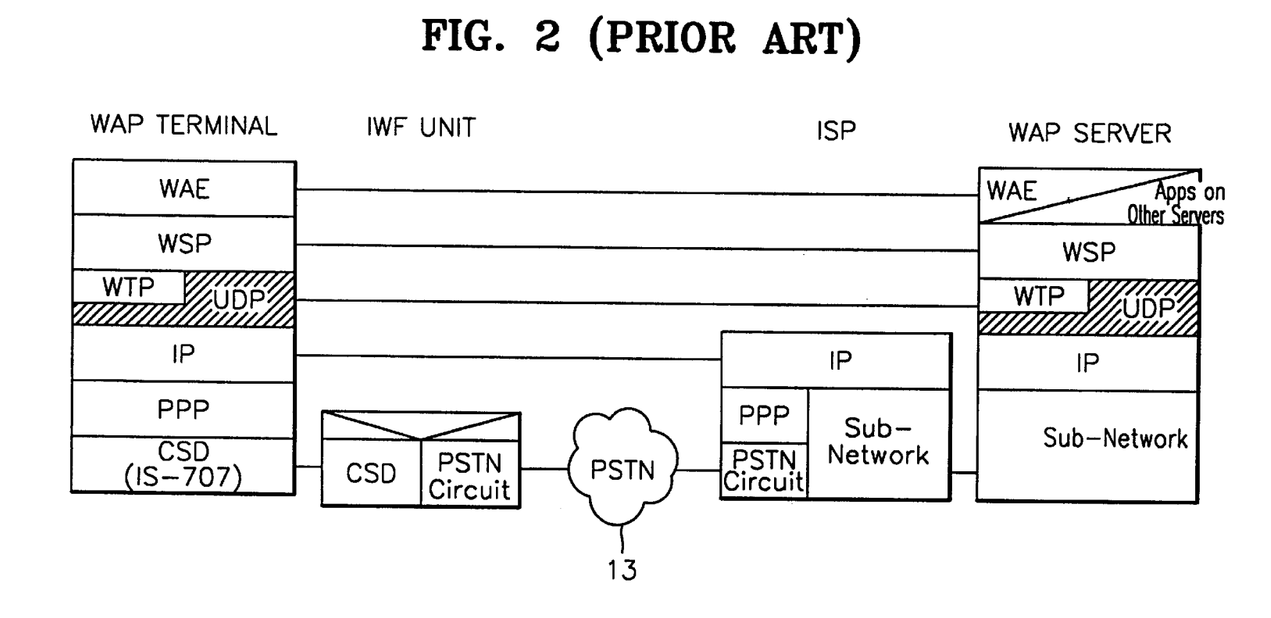
FIG. 2 shows protocol stacks of each block of the conventional data communications device.

FIG. 2 shows a protocol stack of each block of the data communications device shown in FIG. 1.

A protocol stack of the WAP terminal 10 consists of a plurality of protocol layers including a Circuit Switch Data services protocol (CSD(IS-707)), a Peer-to-Peer Protocol (PPP), an Internet Protocol (IP), a Wireless Transaction Protocol (WTP) and User Data Program Protocol (UDP), a Wireless Session Protocol (WSP) and a Wireless Application Environment protocol (WAE). Also, the CSD(IS-707) includes an IS-95 protocol, a Radio Link Protocol (RLP), a PPP, an IP and a TCP. The protocol layers are well known to those skilled in the art, so explanation thereof will be omitted.

Figure 4:
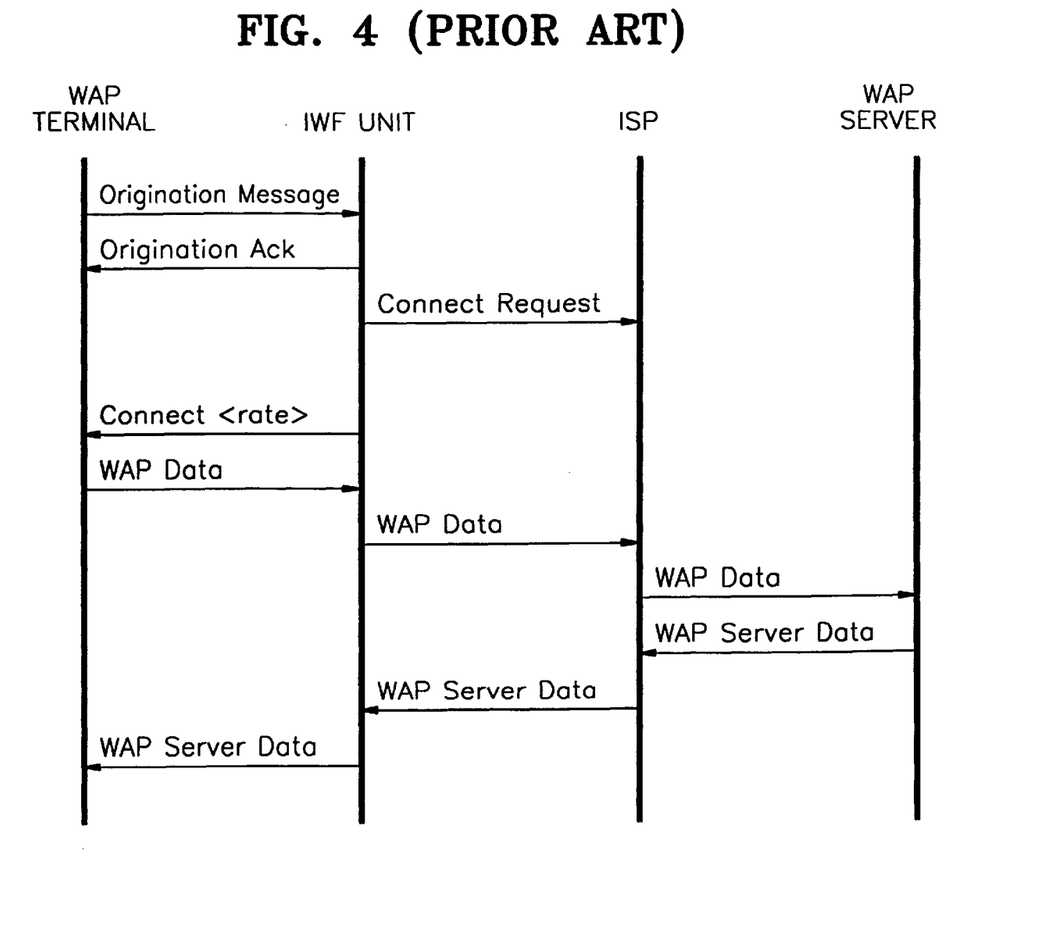
FIG. 4 is a diagram illustrating data flow in the data communications device shown in FIG. 1.

FIG. 4 is a diagram illustrating data flow in the data communications device shown in FIG. 1.

The operation of the data communications device of FIG. 1 will be described with reference to FIG. 4.

It is assumed that the WAP terminal 10 intends to receive Internet or electronic mail (E-mail) services. Here, the WAP terminal 10 is ready to-receive a common call or data (Internet or E-mail) in a normal state. When a user of the WAP terminal 10 connects the WAP terminal 10 through the IWF unit 12 and the PSTN 13 to the ISP 14 using a telephone number for connection with the Internet, the ISP 14 connected to the WAP terminal 10 allows the user to receive the Internet or E-mail services. Also, when the user wants to stop receiving the Internet services, the ISP 14 disconnects the call from the WAP terminal 10, returning to the ready state.

In detail, the WAP terminal 10 sends an Origination Message requesting connection of its call to the IWF unit 12. The IWF unit 12 receives the Origination Message from the WAP terminal 10, and then sends an Origination Ack message acknowledging reception to the WAP terminal 10. The IWF unit 12 sends a Connect Request message for connection of a modem to the ISP 14. The ISP 14 receives the Connect Request message and sends a Connect <rate> message indicating the connection of the modem through the PSTN 13 and the IWF unit 12 to the WAP terminal 10. Under conditions that the WAP terminal 10 and the IWF unit 12 are connected to each other, the WAP terminal 10 sends WAP data (Internet or E-mail services request data) which the user Wants to receive through the IWF 12 and the ISP 14, to the WAP server 16. After the WAP server 16 receives the WAP data, the WAP server 16 sends WAP server data which is retained in the WAP server itself, or data taken from an Internet server (not shown) through the ISP 14, the PSTN 13 and the IWP 12 to the WAP terminal 10.

The data communications device of FIG. 1, having the protocol stack as shown in FIG. 2, has the following problems.

Figure 3:
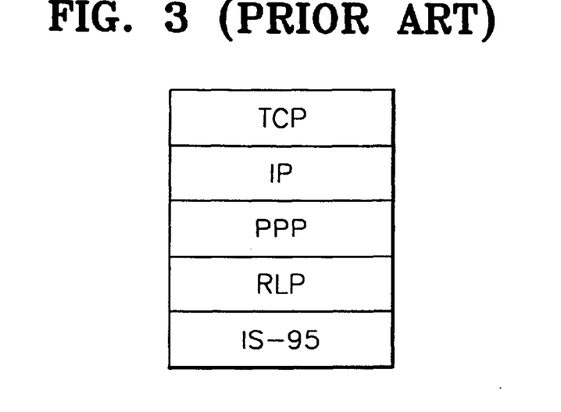
FIG. 3 is a detailed view of the Circuit Switch Data service protocol (CSD(IS-707) shown in FIG. 2.

First, because the CSD(IS-707) in the protocol stack of the WAP terminal 10 includes the IPIPPP as shown in FIG. 3, the protocol stack of the WAP terminal 10 has IP/PPP protocol layers in duplicate. As a result, there is much overhead during transmission of data, so that transmission efficiency becomes low. That is, the resources of the terminal are not efficiently used. Also, when a user intends to connect to the WAP server 16 or the Internet, connection with the ISP 14 is achieved through the PSTN 14. Thus, the connection rate becomes slow, and using the PSTN and the ISP 14 may be subject to charges by the telephone company or the ISP. Also, the transmission of data is inefficient because it requires multiple steps as shown in FIG. 4.

SUMMARY OF THE INVENTION

To solve the above problems, it is a first object of the present invention to provide a device for data communications between a Wireless Application Protocol (WAP) protocol and a WAP server, adopting a protocol stack in which a single Internet Protocol/Peer-to-Peer Protocol (IP/PPP) layer included in a Circuit Switch Data services (ISD) protocol of the WAP terminal is used and an interworking function (IWF) unit also acts as an Internet service provider (ISP).

It is a second object of the present invention to provide a communication method of the data communications device for the first object.

It is a third object of the present invention to provide a device for data communications between a WAP terminal and WAP server, which performs data communications while performing switching between the WAP terminal and a non-WAP terminal.

It is a fourth object of the present invention to provide a communication method of the data communications device for the third object.

Accordingly, to achieve the above first object, there is provided a device for data communications between a Wireless Application Protocol (WAP) terminal and a WAP server, comprising: a plurality of WAP terminals each having a protocol stack in which a Circuit Switch Data service (CSD) protocol layer is laid under a Wireless Transaction Protocol (WTP) layer and a Wireless Datagram Protocol (WDP) layer, for generating WAP data which is service request data; a plurality of WAP servers each having a protocol stack in which a Transmission Control Protocol (TCP) layer and an Internet Protocol (IP) layer are laid under a WTP layer and a WDP layer, for providing the WAP terminals with WAP server data according to the WAP data; and an interworking function (IWF) unit having a CSD protocol layer connected to the CSD protocol layers of each WAP terminal, and a TCP layer and an IP layer which are connected to the TCP and IP layers of each WAP server, for mapping the WAP terminals to the corresponding WAP servers, wherein each WAP terminal communicates with the IWF unit through a single Internet Protocol/Peer-to-Peer Protocol (IP/PPP) layer included in its own CSD protocol layer, and the IWF unit communicates through the Internet with each WAP server.

To achieve the second object, there is provided a communication method of a data communications device including a plurality of WAP terminals having a protocol stack in which a Circuit Switch Data service (CSD) protocol layer is laid under a Wireless Transaction Protocol (WTP) layer and a Wireless Datagram Protocol (WDP) layer, a plurality of WAP servers having a protocol stack in which a Transmission Control Protocol (TCP) layer and an Internet Protocol (IP) layer are laid under a WTP layer and a WDP layer, and an interworking function (IWF) unit having a CSD protocol layer connected to the CSD protocol layers of each WAP terminal, and a TCP layer and an IP layer which are connected to the TCP and IP layers of each WAP server, for communications between each WAP terminal and each WAP server, the method comprising the steps of: (a) transferring an Origination Message for a call connection from each WAP terminal to the IWF unit, and transferring an Origination ACK from the IWF unit to the corresponding WAP terminal in response to the Origination Message; (b) receiving WAP data which is service request data for the WAP servers from the WAP terminals, to map each WAP terminal to the corresponding WAP server in the IWF unit, and transferring the received WAP data through the Internet to the corresponding WAP server; (c) receiving the WAP data to generate WAP server data according to the received WAP data in each WAP server, and transferring the WAP server data through the Internet to the IWF unit; (d) receiving the WAP server data transferred in the step (c) to map the WAP servers to the corresponding WAP terminals in the IWF unit, and transferring the received WAP server data to the corresponding WAP terminals; and (e) communicating in the WAP terminals with the IWF unit through a single Internet Protocol/Peer-to-Peer Protocol (IP/PPP) layer contained in each Circuit Switch Data service (CSD) protocol layer of the WAP terminals.

To achieve the third object, there is provided a device for data communications between a Wireless Application Protocol (WAP) terminal and a WAP server, comprising: a plurality of WAP terminals each having a protocol stack in which a Circuit Switch Data service (CSD) protocol layer is laid under a Wireless Transaction Protocol (WTP) layer and a Wireless Datagram Protocol (WDP) layer, for generating WAP data which is service request data; a non-WAP terminal for generating a common circuit data; a plurality of WAP servers each having a protocol stack in which at least a Transmission Control Protocol (TCP) layer and an Internet Protocol (IP) layer are laid under a WTP layer and a WDP layer, for providing the WAP terminals with WAP server data according to the WAP data; an Internet server for providing the non-WAP terminal with Internet server data according to the common circuit data; an Internet service provider (ISP) having a public switched telephone network (PSTN) circuit layer, for transferring the common circuit data received through a PSTN from the non-WAP terminal, to the Internet server; and an interworking function (IWF) unit having a CSD protocol layer connected to the CSD protocol layers of each WAP terminal, and a TCP layer and an IP layer which are connected to the TCP and IP layers of each WAP server, for performing interfacing between each WAP terminal and each WAP server, and the non-WAP terminal and the ISP, wherein each WAP terminal communicates with the IWF unit through a single Internet Protocol/Peer-to-Peer Protocol (IP/PPP) layer included in its own CSD protocol layer, and the IWF unit communicates through the Internet with each WAP server.

To achieve the fourth object, there is provided a communication method of a data communications device including a plurality of WAP terminals each having a protocol stack in which a Circuit Switch Data service (CSD) protocol layer is laid under a Wireless Transaction Protocol (WTP) layer and a Wireless Datagram Protocol (WDP) layer, a non-WAP terminal for generating a common circuit data, a plurality of WAP servers each having a protocol stack in which at least a Transmission Control Protocol (TCP) layer and an Internet Protocol (IP) layer are laid under a WTP layer and a WDP layer, an Internet server for providing the non-WAP terminal with Internet server data according to the common circuit data, an Internet service provider (ISP) having a public switched telephone network (PSTN) circuit layer, for transferring the common circuit data received through a PSTN from the non-WAP terminal to the Internet server, an interworking function (IWF) unit having a CSD protocol layer connected to the CSD protocol layers of each WAP terminal, and a TCP layer and an IP layer which are connected to the TCP and IP layers of each WAP server, for data communications between each WAP terminal and each WAP server, the method comprising the steps of: (a) determining whether data input to the IWF unit is WAP data or the common circuit data; (b) transferring the WAP data through the Internet to the corresponding WAP server if the input data is determined to be the WAP data in the step (a) and transferring the common circuit data through the ISP to the Internet server if the input data is determined to be the common circuit data in the step (b); (c) determining whether the data input to the IWF unit is WAP server data or the Internet server data; and (d) transferring the WAP server data through the Internet to the corresponding WAP terminal if the input data is determined to be the WAP server data in the step (c), and transferring the Internet server data through the PSTN to the non-WAP terminal if the input data is determined to be the Internet server data in the step (c), wherein each WAP terminal communicates with the IWF unit through a single Internet Protocol/Peer-to-Peer Protocol (IP/PPP) layer included in its own CSD protocol layer.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENTS

Figure 5:
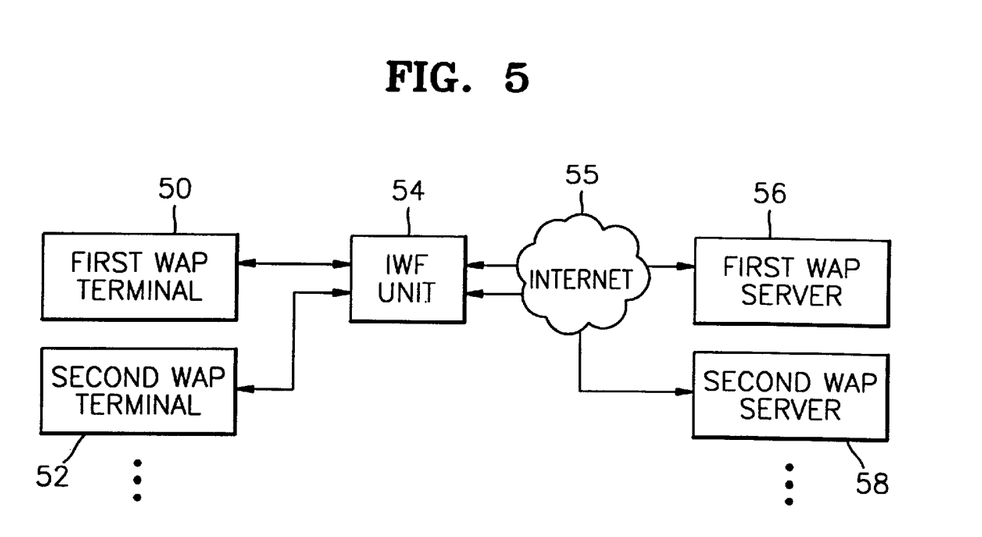
FIG. 5 is a block diagram of a device for data communications between a WAP terminal and a WAP server according to a preferred embodiment of the present invention.

Referring to FIG. 5 showing a device for data communications between a Wireless Application Protocol (WAP) terminal and a WAP server according to a first embodiment of the present invention, the device comprises a plurality of WAP terminals 50, 52, . . . , and an interworking function (IWF) unit 54, the Internet 55 and a plurality of WAP servers 56, 58 . . . .

Each WAP terminal 50, 52, . . . has a protocol stack in which a Circuit Switch Data services protocol (CSD) layer is situated below a Wireless Session Protocol (WSP) layer and a Wireless Datagram Protocol (WDP) layer, and generates WAP data which is data requesting data service from each WAP server 56, 58, . . .

Figure 6:
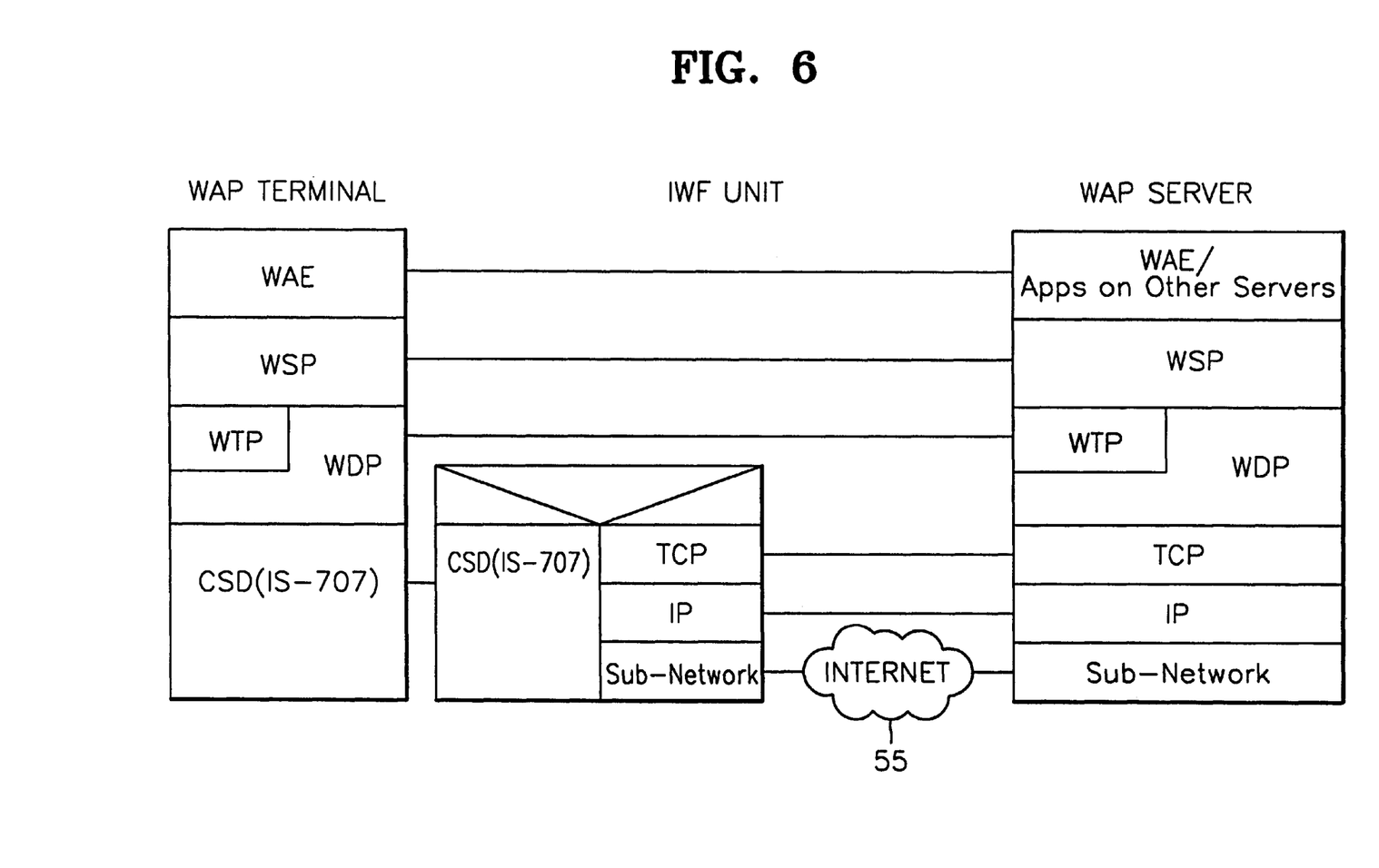
FIG. 6 shows protocol stacks of each block of the data communications device shown in FIG. 5.

FIG. 6 shows a protocol stack of one of the WAP terminals 50, 52, . . . The protocol stack of FIG. 6 is different from that of the conventional WAP terminal of FIG. 2 in that only a CSD(IS-707) layer exists below the WTP and WOP layers and the IP and PPP layers are omitted. That is, because the CSD(IS-707) layer itself includes the IP and PPP layers as described with reference to FIG. 3, the WAP terminal according to the present invention utilizes the IP and PPP layers of the CSD(IS-707), without having IP and PPP layers therein, such that there is no redundant IP and PPP layers unlike the conventional protocol stack. Each WAP terminal 50, 52, . . . has a unique identification number or source IP address.

Each WAP server 56, 58, . . . has a protocol stack in which a CSD layer exists below a WTP layer and a WDP layer, and a Transmission Control Protocol (TCP) layer and an IP layer exist, and provides the WAP terminals 50, 52, . . . with WAP server data according to the WAP data provided. As shown in FIG. 6, a protocol stack of each WAP server 56, 58, . . . has a corresponding structure for each WAP terminal 50, 52, . . . The WAP server of FIG. 6 is different from the conventional WAP server in that it comprises the TCP layer which is not shown in the conventional WAP server. Each WAP server 56, 58, . . . has an identification number or a destination IP address for each source IP address of the WAP terminals 50, 52, . . . .

The IWF unit 54 comprises a CSD protocol layer connected to each CSD protocol layer of the WAP terminals, and TCP and IP layers each connected to the TCP and IP layers of each WAP server, to map the WAP terminals 50, 52, . . . to the corresponding WAP servers 56, 58, . . . Here, the identification number of a specific WAP terminal may be mapped to a destination IP address of the corresponding WAP server, or a source IP address of the WAP terminal is mapped to a specific mapping table value. To this end, the IWF unit 54 has a mapping table (not shown) used for connecting the identification number of a specific WAP terminal to a WAP server. The IWF unit 54 also includes another mapping table (not shown) which is used for finding the corresponding WAP terminal during reception of data from a WAP server. The IWF unit 54 and the WAP servers 56, 58, . . . are connected through the Internet 55.

Figure 7:
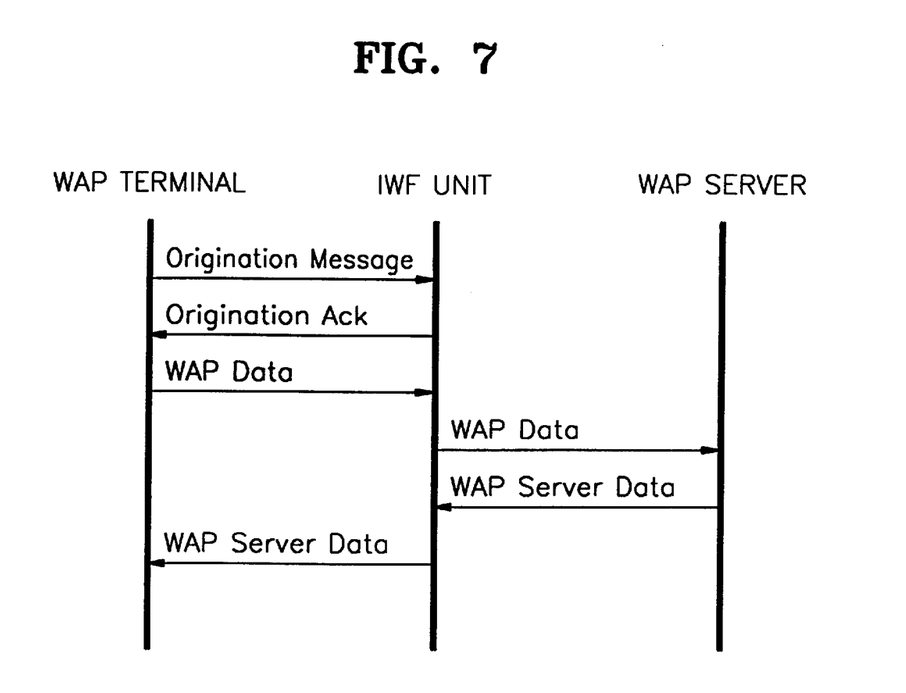
FIG. 7 is a diagram illustrating data flow in the data communications device shown in FIG. 5.

FIG. 7 is a diagram illustrating data flow in the data communications device shown in FIG. 5.

When the WAP terminals 50, 52, . . . send an Origination Message for a call connection thereof to the IWF unit 12, the IWF unit 12 receives the Origination message and then sends an Origination Ack message as a confirmation of the reception to the WAP terminals 50, 52, . . . When one of the WAP terminals 50, 52, . . . receives the Origination Ack message, the WAP terminals 50, 52, . . . being connected to the corresponding WAP servers 56, 58, . . ., send a WAP data which is service request data through the Internet 55 to the WAP servers 56, 58, . . . After receiving the WAP data, the WAP servers 56, 58, . . . send WAP server data which they retain, or data transferred from an Internet server (not shown) through the Internet 55 and the IWF unit 54 to the WAP terminals 50, 52, . . . That is, the WAP terminals 50, 52, . . . are directly connected to the WAP servers without going through an Internet service provider (ISP) using a public switched telephone network (PSTN).

Figure 8:
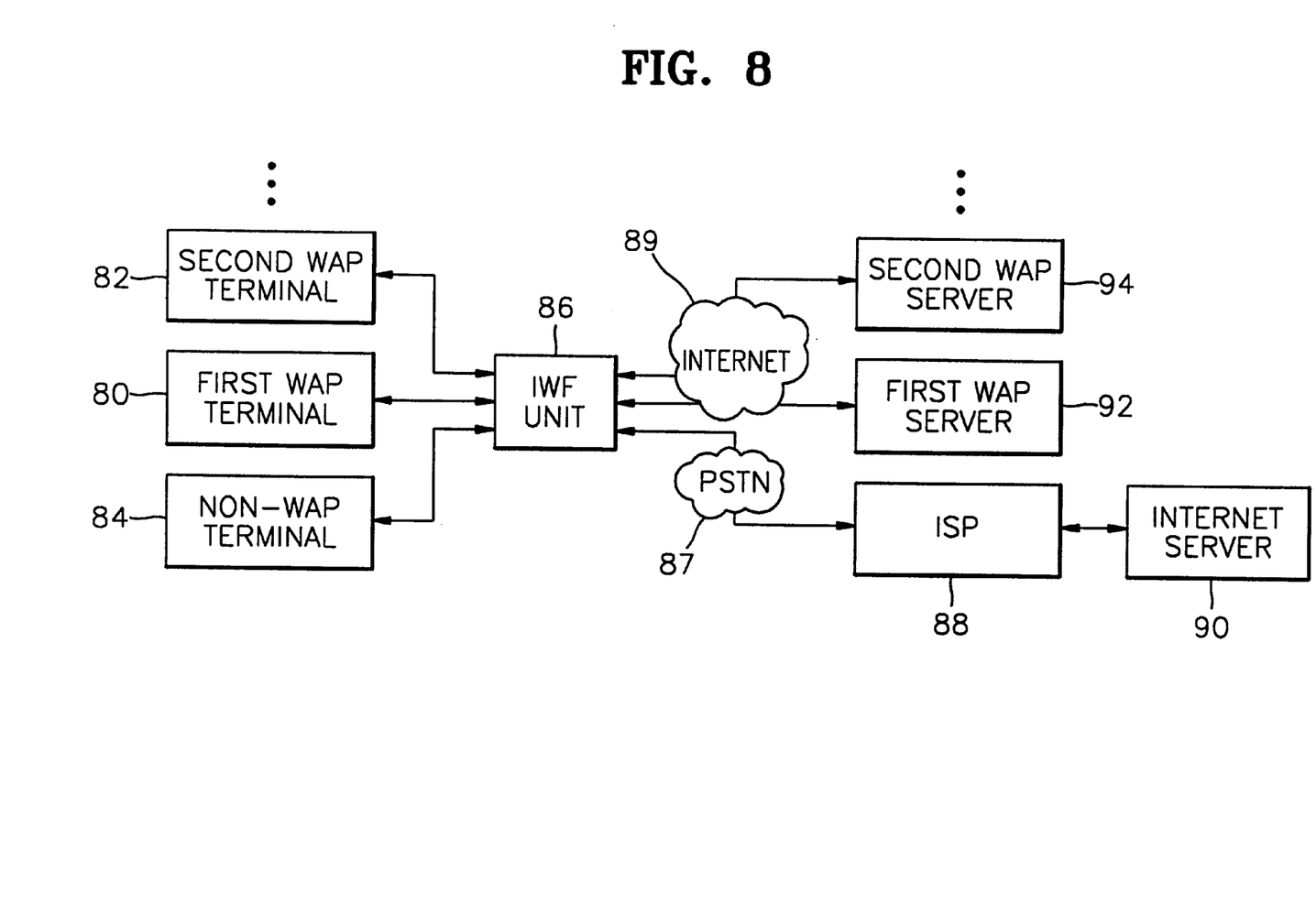
FIG. 8 is a block diagram of a device for data communications between a WAP terminal and a WAP server according to another preferred embodiment of the present invention.

FIG. 8 is a block diagram of a data connection device for communications between a WAP terminal and a WAP server according to another embodiment of the present invention.

The data connection device of FIG. 8 comprises WAP terminals 80, 82, . . . , a non-WAP terminal 84, an IWF unit 86, a PSTN 87, an ISP 88, the Internet 89, an Internet server 90, and WAP servers 92, 94, . . .

Each WAP terminal 80, 82, . . . has a protocol stack in which a CSD protocol is layer resides below WTP and WDP layers, and generates WAP data for requesting data service to the WAP servers 92, 94, . . . Each WAP terminal 80, 82, . . . has a unique identification number or source IP address.

The non-WAP terminal 84 generates a common circuit data.

Each WAP server 92, 94, . . . has a protocol stack in which TCP and IP layers 20 are situated below WTP and WDP layers, and provides the WAP terminals 80, 82, . . . with WAP server data according to the WAP data. Each WAP server 92, 94, . . . has an identification number or a destination IP address corresponding to each source IP address of the WAP terminals 80, 82, . . .

The ISP 88 includes a PSTN circuit layer connected to a PSTN circuit layer of the IWF unit 86 to be described later, receives the common circuit data of the non-WAP terminal 84 through the PSTN 87 and transfers the received data to the Internet server 90. The ISP 88 is one of the companies providing general communication services to a common carrier.

The Internet server 90 provides the non-WAP terminal 84 with Internet server data in response to the common circuit data.

The IWF unit 86 includes a CSD protocol layer, TCP and IP layers and a PSTN circuit layer, and acts as interfaces between the WAP terminals 80, 82, . . . and WAP servers 92, 94, . . . , and between the non-WAP terminal 84 and the ISP 88. The IWF unit 86 is connected through the Internet 89 to the WAP servers 92, 94, and the IWF unit 86 and the ISP 88 are connected to each other through the PSTN 87. The CSD protocol layer is connected to each CSD protocol layer of the WAP terminals 80, 82, . . . , and the TCP and IP layers are connected respectively to the TCP and IP layers of each of the WAP servers 92, 94 . . . Also, the PSTN circuit layer is connected through the PSTN 87 to the PSTN circuit layer of the ISP 88. In detail, when an input data is the WAP data or the WAP server data, interfacing is performed such that an identification number of the WAP terminal is mapped to a destination IP address of the WAP server, or a source IP address of the WAP terminal is mapped to a specific mapping table value. Meanwhile, when an input data is the common circuit data or the Internet server data, interfacing between the non-WAP terminal 82 and the ISP 86 is performed.

Figure 9:
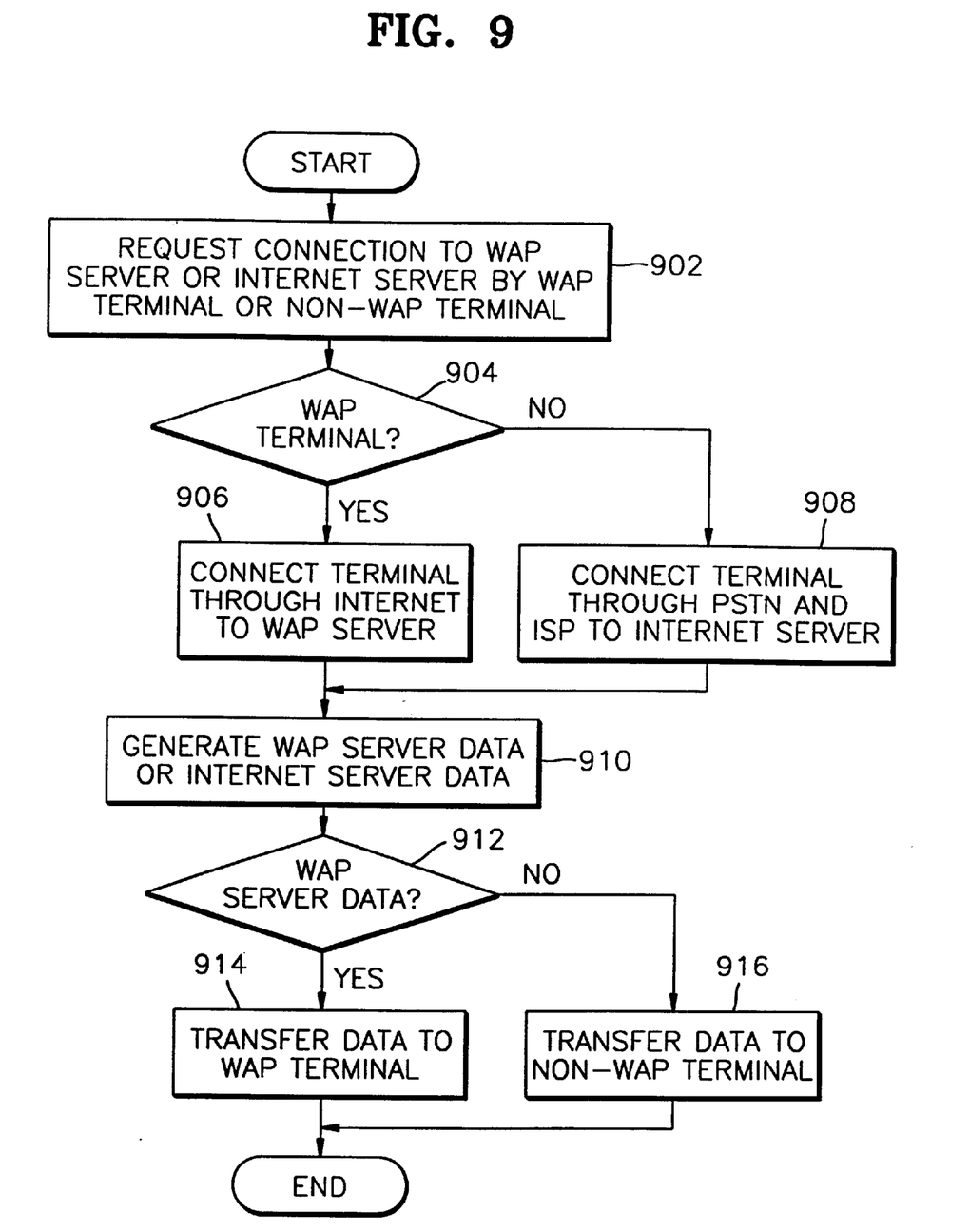
FIG. 9 is a flowchart illustrating a communication method of the data communications device shown in FIG. 8.

FIG. 9 is a flowchart illustrating a data communication method between a WAP terminal and a WAP server according to another embodiment of the present invention.

One of the WAP terminals 80, 82, . . . or the non-WAP terminal 84 requests connection to one of the WAP servers 92, 94, . . . or the Internet server 90 (step 902). That is, one WAP terminal or the non-WAP terminal 84 generates a WAP data or common circuit data, respectively, and transfers the data to the IWF unit 86.

The IWF unit 86 determines whether or not the terminal that needs to be connected in step 902 is a WAP terminal, based on the WAP data or the common circuit data (step 904)

If the connection request terminal is a WAP terminal, the WAP terminal is connected through the Internet 89 to the WAP server (step 906). Meanwhile, if the connection request terminal is not a WAP terminal but a non-WAP terminal, the non-WAP terminal is connected through the PSTN 87 to the ISP 88, and then to the Internet server 90 (step 908).

The WAP server 92 and the Internet server 90 generate WAP server data and Internet server data, respectively, and transfer respective data through the Internet 89, or the ISP 88 and the PSTN 87 to the IWF unit 86.

The IWF unit 86 determines whether or not the input data is WAP server data (step 912).

When the input data is from a WAP server, the data is transferred to the WAP terminal. Meanwhile, when the input data is Internet server data, the data is transferred to the non-WAP terminal 84.

The invention may be embodied in a general purpose digital computer that is running a program from a computer usable medium, including but not limited to storage media such as magnetic storage media (e.g., ROM's, floppy disks, hard disks, etc.), optically readable media (e.g., CD-ROMs, DVDs, etc.) and carrier waves (e.g., transmissions over the Internet).

Hence, the present invention may be embodied as a computer usable medium having a computer readable program code unit embodied therein for communications between a WAP terminal and a WAP server of a data communications device including a plurality of WAP terminals having a protocol stack in which a CSD protocol layer is laid under a WTP layer and a WDP layer, a plurality of WAP servers having a protocol stack in which a TCP layer and an IP layer are laid under a WTP layer and a WDP layer, and an IWF unit having a CSD protocol layer connected to the CSD protocol layers of each WAP terminal, and a TCP layer and an IP layer which are connected to the TCP and IP layers of each WAP server, wherein each WAP terminal communicates through a single IP/PPP protocol layer included in its own CSD protocol layer to the IWF unit, the computer readable program code means in the computer usable medium comprising: computer readable program code means for causing a computer to effect transferring an Origination Message for a call connection from each WAP terminal to the IWF unit, and transferring an Origination ACK from the IWF unit to the corresponding WAP terminal in response to the Origination Message; computer readable program code means for causing a computer to effect receiving WAP data which is service request data for the WAP servers from the WAP terminals, to map each WAP terminal to the corresponding WAP server in the IWF unit, and transferring the received WAP data through the Internet to the corresponding WAP server; computer readable program code means for causing a computer to effect receiving the WAP data to generate WAP server data according to the received WAP data in each WAP server, and transferring the WAP server data through the Internet to the IWF unit; computer readable program code means for causing a computer to effect receiving the WAP server data transferred in the step (c) to map the WAP servers to the corresponding WAP terminal in the IWF unit, and transferring the received WAP server data to the corresponding WAP terminals; and computer readable program code means for causing a computer to effect communicating in the WAP terminals with the IWP unit through a single Internet Protocol/Peer-to-Peer Protocol (IP/PPP) layer contained in each Circuit Switch Data service (CSD) protocol layer of the WAP terminals, for instance.

Also, the present invention may be embodied as a computer usable medium having a computer readable program code unit embodied therein for communications transferred between a WAP terminal and a WAP server of a data communications device including a plurality of WAP terminals each having a protocol stack in which a CSD protocol layer is laid under a Wireless Transaction Protocol (WTP) layer and a WDP layer, a non-WAP terminal for generating a common circuit data, a plurality of WAP servers each having a protocol stack in which at least a TCP layer and an IP layer are laid under a WTP layer and a WDP layer, an Internet server for providing the non-WAP terminal with Internet server data according to the common circuit data, an ISP having a PSTN circuit layer, for transferring the common circuit data received through a PSTN from the non-WAP terminal, to the Internet server, an IWF unit having a CSD protocol layer connected to the CSD protocol layers of each WAP terminal, and a TCP layer and an IP layer which are connected to the TCP and IP layers of each WAP server, wherein each WAP terminal communicates through a single IP/PPP protocol layer included in its own CSD protocol layer to the IWF unit, the computer readable program code means in the computer usable medium comprising: computer readable program code means for causing a computer to effect determining whether data input to the IWF unit is WAP data or the common circuit data; computer readable program code means for causing a computer to effect transferring the WAP data through the Internet to the corresponding WAP server if the input data is determined as the WAP data and transferring the common circuit data through the ISP to the Internet server if the input data is determined to be the common circuit data; computer readable program code means for causing a computer to effect determining whether the data input to the IWF unit is WAP server data or the Internet server data; and computer readable program code means for causing a computer to effect transferring the WAP server data through the Internet to the corresponding WAP terminal if the input data is determined to be the WAP server data, and transferring the Internet server data through the PSTN to the non-WAP terminal if the input data is determined to be the Internet server data, for instance.

A functional program, code and code segments, used to implement the present invention can be derived by a skilled computer programmer from the description of the invention contained herein.

While the present invention has been illustrated and described with reference to specific embodiments, further modifications and alterations within the spirit and scope of this invention as defined by the appended claims will occur to those skilled in the art.

As described above, the data communications device according to the present invention adopts a protocol stack in which only a single IP/PPP protocol layer resides in the WAP terminals and the IWF unit functions as an ISP, providing the following effects. First, because there is no redundancy of IP/PPP protocol layers in the WAP terminal, overhead is considerably reduced compared to the conventional data transmission. Second, the IWF unit is directly connected through the Internet to the WAP server, not through the PSTN and the ISP, so that connection time and costs can be reduced. Third, the data flow procedure is also simplified compared to the conventional data communications device and method thereof.

What is claimed is:

1. A system for data communications between a Wireless Application Protocol (WAP) terminal and a WAP server, comprising:

a plurality of WAP terminals each having a protocol stack in which a Circuit Switch Data service (CSD) protocol layer is laid under a Wireless Transaction Protocol (WTP) layer and a Wireless Datagram Protocol (WDP) layer, for generating WAP data which is service request data;

a plurality of WAP servers each having a protocol stack in which a Transmission Control Protocol (TCP) layer and an Internet Protocol (IP) layer are laid under a WTP layer and a WDP layer, for providing the WAP terminals with WAP server data according to the WAP data; and an interworking function (IWF) unit having a CSD protocol layer connected to the CSD protocol layer of each of the WAP terminals, and a TCP layer and an IP layer which are connected to the TCP and IP layers of each WAP server, for mapping the WAP terminals to corresponding one of the WAP servers, wherein each of the WAP terminals communicates with the IWF unit though a single Internet Protocol/Peer-to-Peer Protocol (IP/PPP) layer included in its own CSD protocol layer, and the IWF unit communicates through the Internet with each of the WAP servers.

2. The device of claim 1, wherein the IWF unit includes a mapping table used for mapping each of the WAP terminals to a corresponding one of the WAP servers, wherein identification numbers of each of the WAP terminals and destination IP addresses of each of the WAP servers are mapped to each other, or source IP addresses of each of the WAP terminals are mapped to corresponding mapping table values.

3. A communication method of a data communications system including a plurality of WAP terminals having a protocol stack in which a Circuit Switch Data service (CSD) protocol layer is laid under a Wireless Transaction Protocol (WTP) layer and a Wireless Datagram Protocol (WDP) layer, a plurality of WAP servers having a protocol stack in which a Transmission Control Protocol (TCP) layer and an Internet Protocol (IP) layer are laid under a WTP layer and a WDP layer, and an interworking function (IWF) unit having a CSD protocol layer connected to the CSD protocol layers of each of the WAP terminals, and a TCP layer and an IP layer which are connected to the TCP and IP layers of each of the WAP servers, for communications between each of the WAP terminals and each of the WAP servers, the method comprising the steps of:

(a) transferring an Origination Message for a call connection from each of the WAP terminals to the IWF unit, and transferring an Origination ACK from the IWF unit to a corresponding one of the WAP terminals in response to the Origination Message;

(b) receiving WAP data which is service request data for the WAP servers from the WAP terminals, to map each of the WAP terminals to a corresponding one of the WAP servers in the IWF unit, and transferring the received WAP data through the Internet to the corresponding one of the WAP servers;

(c) receiving the WAP data to generate WAP server data according to the received WAP data in each of the WAP servers, and transferring the WAP server data through the Internet to the IWF unit;

(d) receiving the WAP server data transferred in the step (c) to map the WAP servers to corresponding ones of the WAP terminals in the IWF unit, and transferring the received WAP server data to the corresponding one of the WAP terminals; and (e) communicating in the WAP terminals with the IWF unit through a single Internet Protocol/Peer-to-Peer Protocol (IP/PPP) layer contained in each Circuit Switch Data service (CSD) protocol layer of the WAP terminals.

4. A computer usable medium having a computer readable program code unit embodied therein for communications between a WAP terminal and a WAP server of a data communications device including a plurality of WAP terminals having a protocol stack in which a CSD protocol layer is laid under a WTP layer and a WDP layer, a plurality of WAP servers having a protocol stack in which a TCP layer and an IP layer are laid under a WTP layer and a WDP layer, and an IWF unit having a CSD protocol layer connected to the CSD protocol layers of each WAP terminal, and a TCP layer and an IP layer which are connected to the TCP and IP layers of each WAP server, wherein each of the WAP terminal communicates through a single IP/PPP protocol layer included in its own CSD protocol layer to the IWF unit, the computer readable program code means in the computer usable medium comprising:

first computer readable program code means for causing a computer to effect transferring an Origination Message for a call connection from each of the WAP terminals to the IWF unit, and transferring an Origination ACK from the IWF unit to a corresponding one of the WAP terminals in response to the Origination Message;

second computer readable program code means for causing the computer to effect receiving WAP data which is service request data for the WAP servers from the WAP terminals, to map each of the WAP terminals to a corresponding one of the WAP servers in the IWF unit, and transferring the received WAP data through the Internet to the corresponding one of the WAP servers;

third computer readable program code means for causing the computer to effect receiving the WAP data to generate WAP server data according to the received WAP data in each of the WAP servers, and transferring the WAP server data through the Internet to the IWF unit;

fourth computer readable program code means for causing the computer to effect receiving the WAP server data transferred by the third computer readable program code means to map the WAP servers to the corresponding one of the WAP terminals in the IWF unit, and transferring the received WAP server data to the one of the WAP terminals; and fifth computer readable program code means for causing the computer to effect communicating in the WAP terminals with the IWP unit through a single Internet Protocol/Peer-to-Peer Protocol (IP/PPP) layer contained in each Circuit Switch Data service (CSD) protocol layer of the WAP terminals.

* * * * *